United States Patent [19]
James

[11] Patent Number: 5,907,236
[45] Date of Patent: May 25, 1999

[54] RESONANCE TAPPED TRANSFORMER

[75] Inventor: David Alun James, Christchurch, New Zealand

[73] Assignee: Swichtec Power Systems Limited, Christchurch, New Zealand

[21] Appl. No.: 08/981,487

[22] PCT Filed: Jun. 18, 1996

[86] PCT No.: PCT/NZ96/00058

§ 371 Date: Dec. 29, 1997

§ 102(e) Date: Dec. 29, 1997

[87] PCT Pub. No.: WO97/01883

PCT Pub. Date: Jan. 16, 1997

[30] Foreign Application Priority Data

Jun. 28, 1995 [NZ] New Zealand ............................ 272458

[51] Int. Cl.$^6$ ................................ G05F 1/14; G05F 1/24; G05B 24/02
[52] U.S. Cl. ............................ 323/255; 323/259; 323/346
[58] Field of Search ................................ 323/255, 259, 323/328, 346, 361; 363/165, 142, 143, 44; 336/147

[56] References Cited

U.S. PATENT DOCUMENTS

| | | | |
|---|---|---|---|
| 1,639,695 | 8/1927 | Heegner | 363/165 |
| 3,845,437 | 10/1974 | Goodman | 323/346 |
| 5,625,543 | 4/1997 | Barrett | 363/44 |
| 5,668,707 | 9/1997 | Barrett | 363/44 |

*Primary Examiner*—Peter S. Wong
*Assistant Examiner*—Rajnikant B. Patel
*Attorney, Agent, or Firm*—Jacobson, Price, Holman & Stern, PLLC

[57] ABSTRACT

A resonance tapped transformer circuit in which the effective turns ratio of the transformer is dependent on the frequency of the input signal. The transformer selectively connects one or more primary coils of the transformer in series and/or in parallel where the connection type is dependent on the line frequency. This changes the transformation ratio of the transformer.

18 Claims, 5 Drawing Sheets

RESONANCE TAPPED TRANSFORMER

TECHNICAL FIELD

The present invention relates to voltage converters. More particularly, although not exclusively, the present invention relates to resonance tapped transformer circuits in which the effective turns ratio of the transformer is dependent on the frequency of the input signal.

BACKGROUND OF THE INVENTION

DC—DC converter techniques which are known in the art include pulse width modulation (PWM) DC—DC converters and resonant series and parallel converters. Such methods are known to be susceptible to switching losses, particularly in the former case, and conduction losses.

In a conventional PWM DC—DC converter using switching transistors, the switches have an inherent capacitance which results in a residual voltage across the switch when the switches are alternately open and closed. Accordingly, it is desirable to delay switching to allow discharge of the capacitance by placing an inductor in series with the load resistance. This will resist the change in the current flow due to the residual field in the inductor. With no inductance, the power factor is close to unity. If an inductor is added in series with the load the power factor lags and soft switching is provided.

Ideally the current and voltage in a circuit element will be in phase. However, if there is a slight phase difference there will be instants where the current is positive and the voltage negative (or vice versa). In this situation the instantaneous power will be negative and the power transmitted will be effectively reduced. Thus the power transmission is less for the same time averaged values of voltage and current.

To obtain the same or a desired level of power transmission, the voltage must be increased but this increases the current correspondingly which leads to increased $I^2R$ losses (or conduction losses). The traditional method of reducing output voltage in a PWM converter is to reduce the duty cycle. But as the duty cycle is reduced, the peak current is increased if the same average current is to be maintained. However, as the peak current is increased the $I^2R$ losses become disproportionately high.

In presently known resonant circuits, it is possible to reduce the voltage by putting a reactance in series with the load. However, this may significantly impair the power factor. The present invention avoids the need for such a reactance and further provides an inductance to effect a lagging power factor (or soft switching). The present invention further provides for a converter where the turns ratio may be varied (and therefore the conversion ratio adjusted) while retaining the use of all of the primary windings.

It is an object of the present invention to overcome or at least mitigate some of the disadvantages inherent in the prior art or to at least provide the public with a useful choice.

DISCLOSURE OF THE INVENTION

In one aspect this invention provides a transformer circuit adapted to selectively connect a plurality of primary coils of a transformer in series and/or in parallel, wherein the connection type is dependent upon the line frequency, thereby changing the transformation ratio of the transformer.

Preferably the transformer circuit comprises:
a plurality of first circuit elements;
a plurality of second circuit elements;
a plurality of primary transformer coils;
wherein the first and second elements have conductivities which vary as a function of the line frequency and are connected in such a manner that at a first frequency the plurality of primary transformer coils are connected in parallel and at a second line frequency the plurality of primary transformer coils are connected in series.

In a further embodiment the present invention provides for a transformer circuit comprising:
a plurality of primary transformer coils;
at least two first circuit elements;
at least one second circuit element wherein one of the first circuit elements, connected in series with the second circuit element, is connected in parallel with a first primary transformer coil and the other first circuit element, connected in series with the second circuit element, is connected in parallel with a second primary transformer coil.

Preferably the first and second circuit elements comprise impedance elements having first and second resonant frequencies respectively.

Preferably the circuit elements can include inductive and/or capacitive components.

Preferably the circuit impedance element comprises an inductive element.

Preferably the impedance elements have variable inductance.

Preferably the impedance elements have variable capacitance.

In an alternative embodiment the present invention provides for a transformer circuit wherein each of the portions of the primary transformer coil are arranged so as to have a common core.

In an alternative embodiment the present invention provides for a transformer circuit wherein each of the portions of the primary transformer coil further incorporate a first and second secondary transformer coil coupled to the first and second primary transformer coil respectively wherein the portions of the secondary transformer are connected in parallel or in series.

In an alternative embodiment the transformer may be split into two or more parts each comprising a primary and secondary coil.

The transformer circuit is bidirectional and the resonant network could equally be configured on the secondary.

The present invention will now be described by way of example only and with reference to the drawings.

Figure 7:
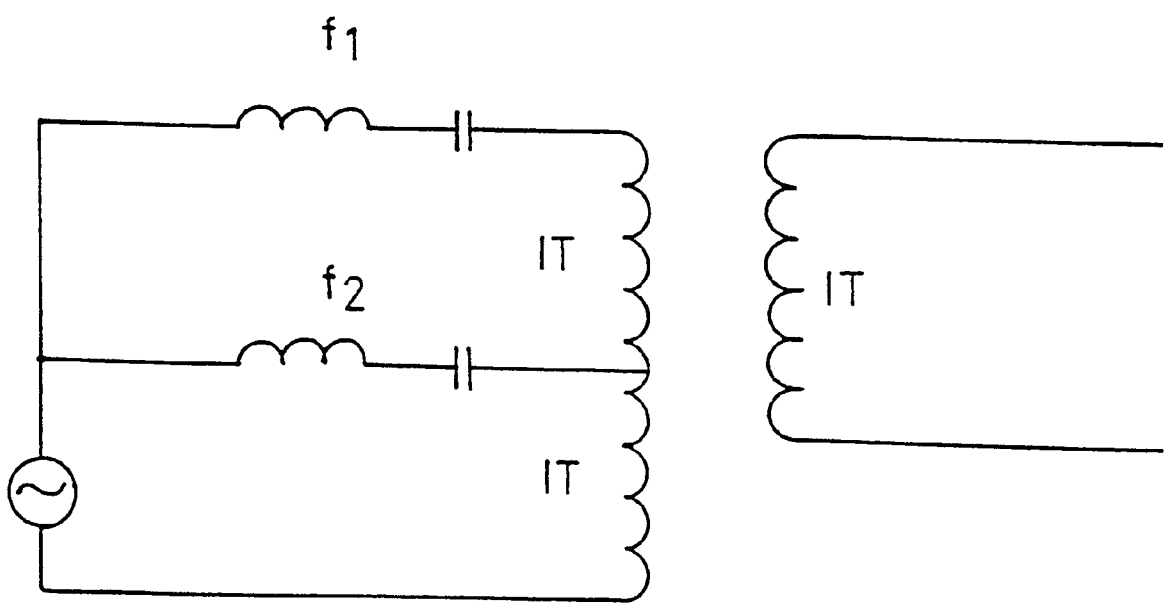
FIG. 7 illustrates a simplified frequency dependant variable turns ratio circuit.

The present invention can be explained broadly in the context of varying the transformation ratio of a simple transformer. Such a circuit is shown in FIG. 7. At frequency $f_1$ there is provided a 2:1 turns ratio and at frequency $f_2$ there is provided a 1:1 turns ratio. This assumes equal turns T in each coil.

While this circuit provides a frequency switched voltage transformation ratio, it is inefficient as, when in 1:1 turns ratio mode, half of the primary windings remain unused.

Figure 1:
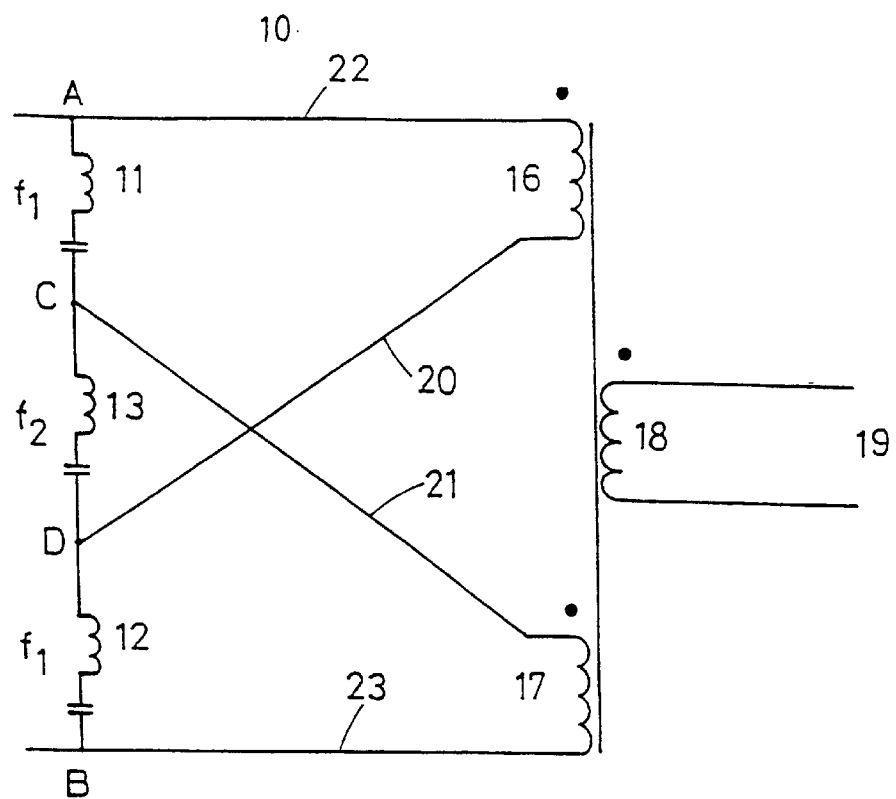
FIG. 1 illustrates a resonance tapped transformer circuit employing three inductive elements.

Referring to FIG. 1 an exemplary embodiment of a resonance tapped transformer is shown.

An input signal is provided across the terminals A and B. The input signal may include waveforms such as a switched DC input voltage for a DC—DC converter application, or may be simply a sine wave AC input corresponding to a 50 Hz mains signal.

The following discussion will refer to the circuit elements as impedance elements. However, it is to be understood that components having frequency dependent conductivity, variable inductance or variable capacitance may be used.

First impedance elements 11 and 12 each comprise a series LC circuit with a resonant frequency $f_1$. A second circuit element 13 comprises a series LC circuit with a resonant frequency $f_2$. Primary transformer windings are indicated by 16 and 17. Secondary transformer windings are indicated by the numeral 18.

A first primary transformer winding 16 is connected in parallel across first and second impedance elements 11 and 13 via the input line 22 and cross connect line 20. A second primary transformer winding 17 is connected across impedance elements 13 and 12 by means of input line 23 and cross connect line 21.

Figure 5:
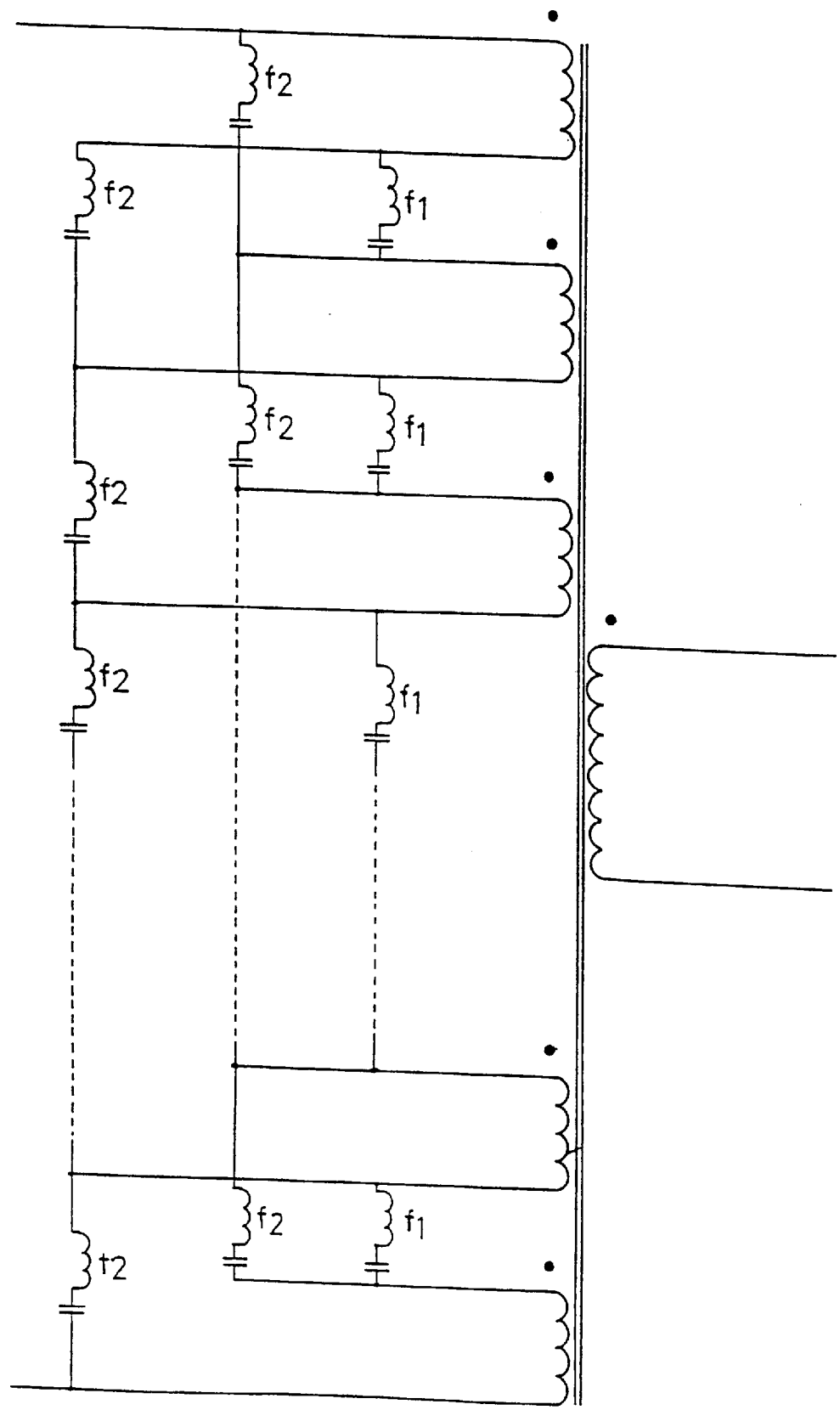
FIG. 5 illustrates an N primary configuration.

Impedance elements 11 and 12, when in the form of inductors, may be wound on the same former. This construction does not significantly alter the operation of the circuit, but reduces its sensitivity to mismatches in the resonant frequency of the two resonant circuits 11 and 12. Referring to FIG. 5, the elements $f_1$, may be wound onto the same former with the same effect. Similarly, the elements $f_2$ may be wound into the same former.

Referring to FIG. 1, the circuit 10 can operate in two modes, parallel and series. The parallel mode corresponds to primary windings 16 and 17 being connected in parallel and series mode corresponds to primary windings 16 and 17 being connected in series.

In a situation where the input signal has a frequency $f_1$, primary impedance elements 11 and 12 will have low impedance and thus points AC and DB will be conductively connected, and primary coils 16 and 17 will be effectively connected in parallel. Impedance element 13 will have relatively high impedance so as to allow minimal current flow between CD. This configuration corresponds to a 1:1 turns ratio and hence a unity voltage transformation ratio assuming equal turns on each winding.

Where the input signal has a frequency $f_2$ the points CD will be conductively connected, AC, BD isolated and the primary coils 16 and 17 will be effectively connected in series thus providing a 2:1 turns ratio and hence a 2:1 voltage transformation ratio. At $f_2$, impedance elements 11 and 12 will have a relatively high impedance.

As the input signal frequency is varies from $f_1$ to $f_2$, a continuously variable turns ratio from 1:1 to 1:2 may be achieved. Thus the turns ratio may be continuously varied by varying the frequency of the input signal.

Figure 3:
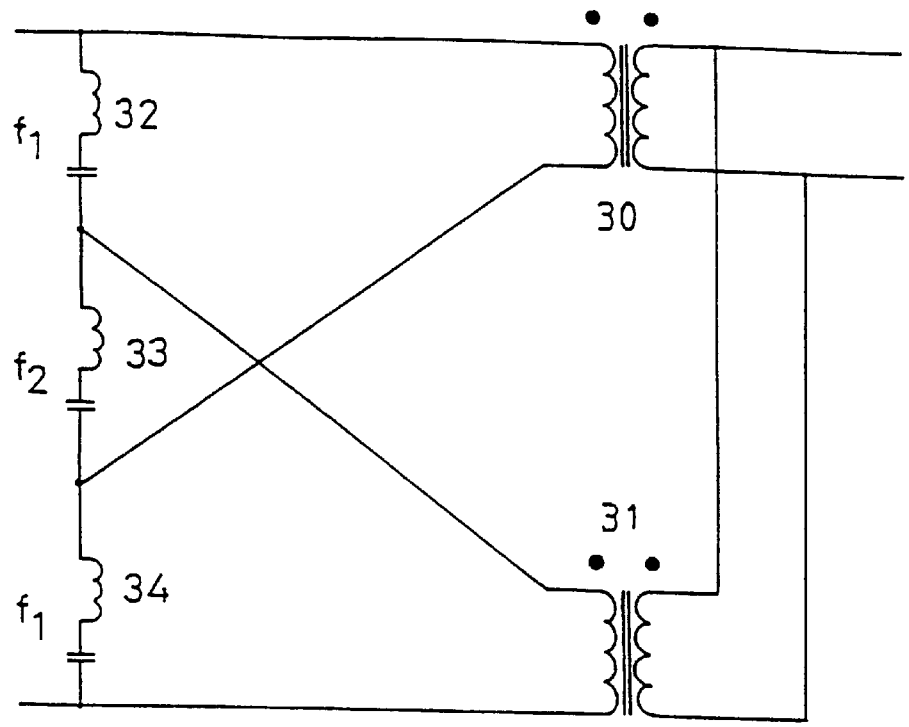
FIG. 3 illustrates an embodiment of a resonance tapped transformer in which the transformer is split into two elements.

The resonance tapped transformer circuit shown in FIG. 3 behaves in fundamentally the same manner as the circuit discussed above, except that the transformer is split into two parts 30 and 31, each comprising a primary and secondary coil in which the primary is connected in parallel across a series network comprising the first (32 and 34) and second (33) circuit element. The second of the primary coils is connected similarly. The two transformer parts have their secondary coils connected in parallel or series.

Figure 2:
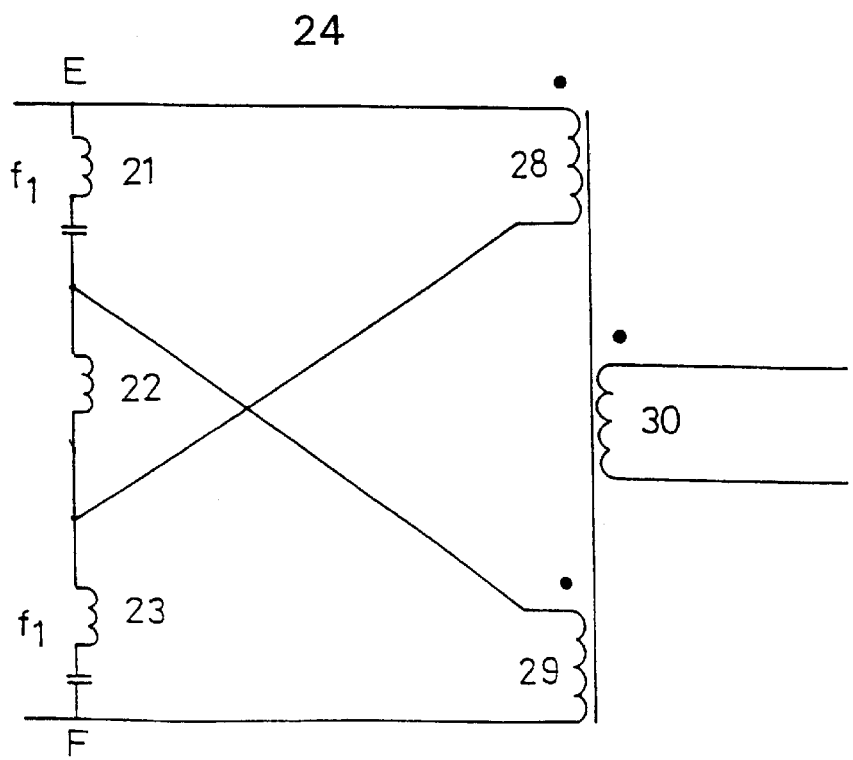
FIG. 2 illustrates an alterative embodiment of a resonance tapped transformer.
Figure 4:
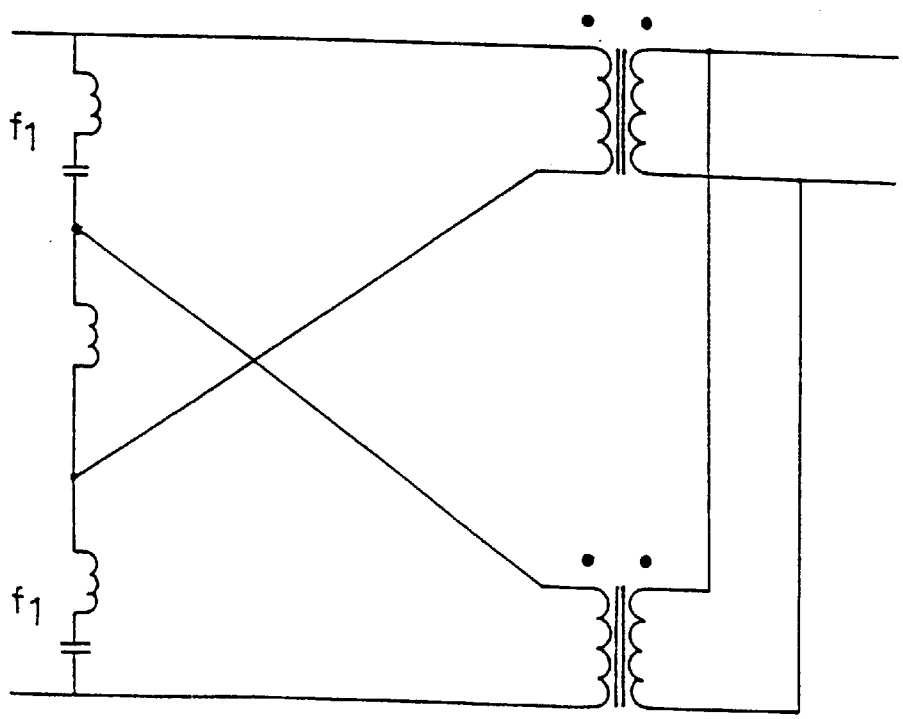
FIG. 4 illustrates an alternative embodiment of a split core resonance tapped transformer.

In an alternative embodiment, a lagging power factor version is provided as shown in FIGS. 2 and 4. Referring again to FIG. 1, if the input frequency is less than $f_2$, the impedance of the second impedance element 13 is mainly capacitive. However, for a lagging power factor the input impedance across A and B must be inductive, therefore an alternative configuration is required in which the second circuit element 13 is purely inductive for frequencies less than $f_2$.

Referring to FIG. 2, a circuit 24 which implements a lagging power factor is shown. At an input frequency $f_1$ first impedance elements 21 and 23 are conductively connected and therefore the primary windings 28 and 29 will be connected in parallel thereby producing a 1:1 turns ratio and 1:1 voltage transformation ratio.

To provide a lagging power factor the switch current must slightly lag the voltage. In the situation described above the inductor 22 causes a lagging power factor. That is: the input impedance across E and F is inductive.

For signal frequencies above $f_1$ all of the impedance elements 21, 22 and 23 are inductive therefore the power factor lags and soft switching is effected.

The impedance elements 21 and 23 are slightly capacitive for frequencies slightly less than $f_1$ depending on load resistance. At such a frequency, the circuit elements exhibit matching properties which allow the turns ratio to be greater than 1:1. At frequencies above $f_1$, the impedance of 21 and 23 increases faster than impedance at 22. Therefore, the turns ratio reduces towards 2:1.

FIG. 4 illustrates a variation of FIG. 2, providing a lagging power factor with two transformer cores. The input circuit is identical to that shown in FIG. 2.

Figure 6:
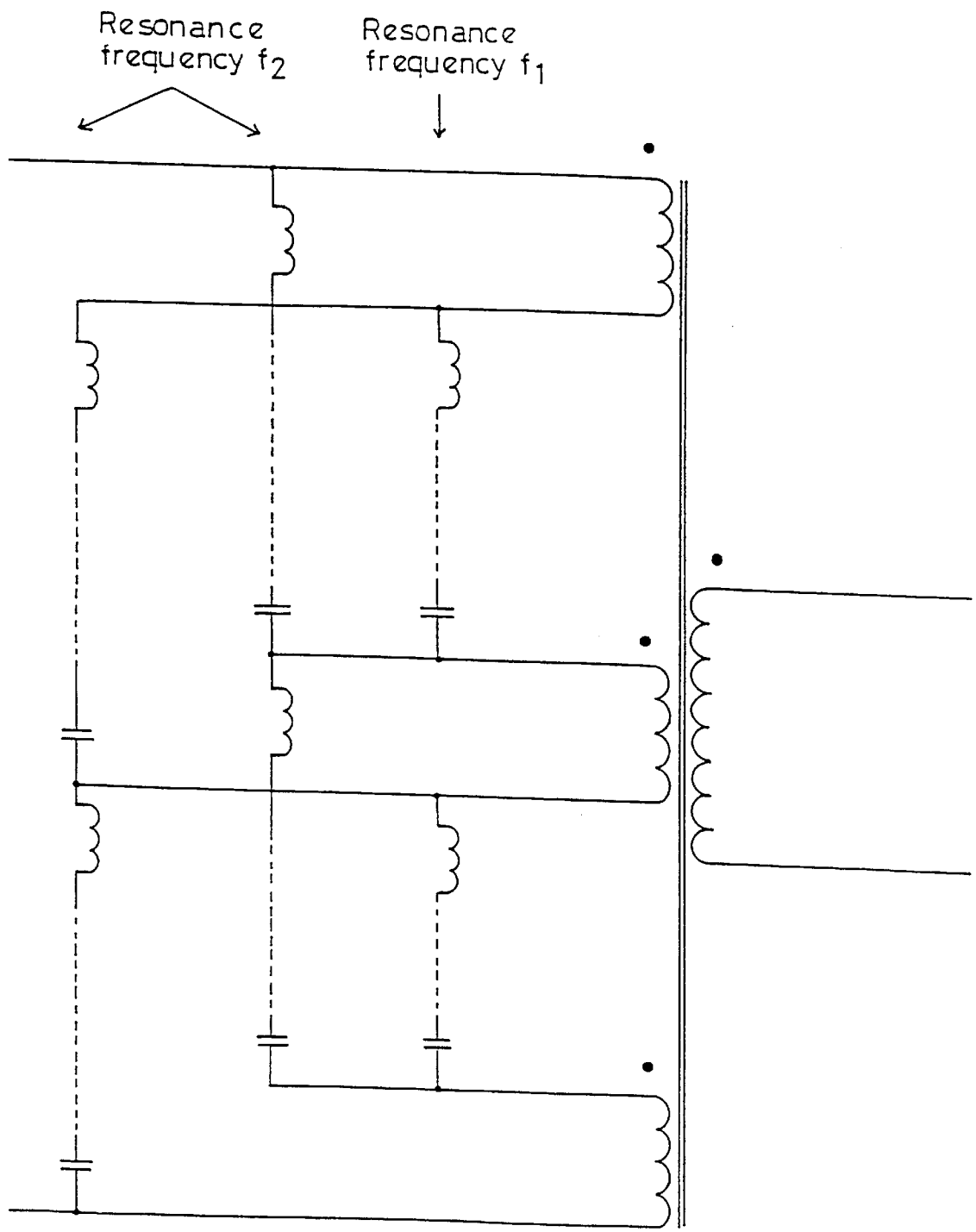
FIG. 6 illustrates the basic circuit element of the circuit in FIG. 5.

The resonance tapped transformer circuit of the present invention may be generalised to a transformer with N primary windings. Such configurations are illustrated by FIGS. 5 and 6.

Referring to FIG. 5, at a signal frequency $f_1$ all the series resonant networks labelled $f_1$ will have low impedance. All of the primary transformer coil windings are therefore connected in series providing a N:1 turns ratio. This treatment assumes that all primary and secondary transformer windings are of equal turns.

For signal frequencies equal to $f_2$ all the series resonant networks labelled $f_2$ will have low impedance thereby connecting all of the primary transformer coil windings in parallel to provide a 1:1 turns ratio. Again soft switching may be provided by omitting the capacitor in the series resonant network labelled $f_2$. FIG. 6 shows the basic circuit element of FIG. 5 with frequency dependant conducting networks having resonant frequencies $f_1$ and $f_2$.

Thus by the invention there is provided a resonant tapped transformer input circuit providing a continuously variable turns ratio from 1:1 to N:1 where N is the number of primary transformer coils.

It is envisaged that alternative impedance elements may be employed depending on the requirements of a particular situation. It is further envisaged that variable inductance or variable capacitance elements may be used. Such a variable inductor may be a saturable reactor. Other components may be substituted where appropriate, the essential element of the invention being the dual or multiple mode behaviour of the transformer as a function of the input signal frequency.

The present invention may also be modified to be responsive to more than two input signal frequencies. For example, if the impedance elements shown as $f_1$ in FIG. 5 are replaced by a mix of components having resonant frequencies $f_1$ and $f_3$, mixed series and parallel connections result thereby producing different transformation ratios. Such modifications and extensions of the present invention to multiple frequency configurations are considered to be within the scope of the present invention.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

I claim:

1. A transformer circuit comprising:

a plurality of first circuit elements;

a plurality of second circuit elements;

a plurality of primary transformer coils;

wherein the first and second elements have conductivities which vary as a function of the line frequency and are connected in such a manner that at a first frequency the plurality of primary transformer coils are connected in parallel and at a second line frequency the plurality of primary transformer coils are connected in series.

2. A transformer circuit as claimed in claim 1 wherein the first and second circuit elements comprise impedance elements having first and second resonant frequencies respectively.

3. A transformer circuit as claimed in claim 1 wherein the circuit elements include inductive and/or capacitive components.

4. A transformer circuit as claimed in claim 1 wherein the second circuit element comprises an inductive element.

5. A transformer circuit as claimed in claim 2 wherein any of the impedance elements have variable inductance.

6. A transformer circuit as claimed in claim 1 wherein the circuit elements have variable controlled impedance and the line frequency is fixed thereby changing the transformation ratio of the transformer.

7. A transformer circuit as claimed in claim 1 wherein portions of the primary transformer coils are arranged so as to have a common core.

8. A transformer circuit as claimed in claim 1 wherein the transformer is split into two or more parts, each comprising a primary and secondary coil.

9. A transformer circuit as claimed in claim 1 wherein portions of the primary transformer coils further incorporate a first and second transformer coil respectively, wherein the first and second coils are connected in parallel or in series.

10. A transformer circuit comprising:

a plurality of primary transformer coils;

at least two first circuit elements;

at least one second circuit element wherein the first and second circuit elements have conductivities which vary as a function of the line frequency and wherein one of the first circuit elements, connected in series with the second circuit element, is connected in parallel with a first primary transformer coil and the other first circuit element, connected in series with the second circuit element, is connected in parallel with a second primary transformer coil.

11. A transformer circuit as claimed in claim 10 wherein the first and second circuit elements comprise impedance elements having first and second resonant frequencies respectively.

12. A transformer circuit as claimed in claim 10 wherein the circuit elements include inductive and/or capacitive components.

13. A transformer circuit as claimed in claim 10 wherein the second circuit element comprises an inductive element.

14. A transformer circuit as claimed in claim 11 wherein any of the impedance elements have variable inductance.

15. A transformer circuit as claimed in claim 10 wherein the circuit elements have variable controlled impedance and the line frequency is fixed thereby changing the transformation ratio of the transformer.

16. A transformer circuit as claimed in claim 10 wherein portions of the primary transformer coils are arranged so as to have a common core.

17. A transformer circuit as claimed in claim 10 wherein portions of the primary transformer coils further incorporate a first and second transformer coil respectively, wherein the first and second coils are connected in parallel or in series.

18. A transformer circuit adapted to selectively connect a plurality of primary coils of a transformer in series and/or in parallel depending upon line frequency, wherein at a first line frequency the coils are connected in parallel and at a second line frequency the coils are connected in series.

* * * * *